(12) United States Patent
Heiles

(10) Patent No.: US 6,701,086 B1
(45) Date of Patent: Mar. 2, 2004

(54) METHOD FOR MONITORING THE SIGNAL QUALITY IN OPTICAL NETWORKS

(75) Inventor: Juergen Heiles, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/343,017

(22) Filed: Jun. 29, 1999

(30) Foreign Application Priority Data

Jun. 29, 1998 (DE) .......................................... 198 28 971

(51) Int. Cl.⁷ .......................... H04B 10/08; H04B 17/00
(52) U.S. Cl. ........................................... 398/30; 398/34
(58) Field of Search ................................ 359/110, 124, 359/159, 135, 174; 398/25, 30, 34, 35; 370/252

(56) References Cited

U.S. PATENT DOCUMENTS

| | | | | |
|---|---|---|---|---|
| 5,500,756 A | * | 3/1996 | Tsushima et al. ............ 359/110 |
| 5,617,237 A | | 4/1997 | Bogdan ....................... 359/180 |
| 5,974,237 A | * | 10/1999 | Shurmer et al. ............. 709/223 |
| 6,018,406 A | * | 1/2000 | Ishimatsu et al. ........... 359/110 |
| 6,049,530 A | * | 4/2000 | Petersen et al. ............. 370/248 |
| 6,058,102 A | * | 5/2000 | Drysdale et al. ............. 370/248 |
| 6,094,442 A | * | 7/2000 | Okamoto et al. ............ 359/110 |
| 6,112,236 A | * | 8/2000 | Dollin et al. ................ 370/253 |
| 6,317,231 B1 | * | 11/2001 | Al-Salameh et al. ........ 359/110 |

FOREIGN PATENT DOCUMENTS

| | | |
|---|---|---|
| DE | 31 47 555 | 5/1988 |
| DE | 43 26 277 | 2/1995 |

* cited by examiner

Primary Examiner—Jason Chan
Assistant Examiner—Shi K. Li
(74) Attorney, Agent, or Firm—Bell Boyd & Lloyd LLC

(57) ABSTRACT

Given a measuring arrangement at the transmission side (MQ), quality criteria of the useful load signals (WS) are transmitted together with a timing mark to the measuring arrangement at the reception side (MS) at the end of a transmission path (OMS1) in a given time interval. The measuring arrangement at the reception side (MS) carries out the same measuring procedures1, compares both measured values (MEQ, MES) and sends the measuring result (ME) to a central location (ZS).

8 Claims, 2 Drawing Sheets

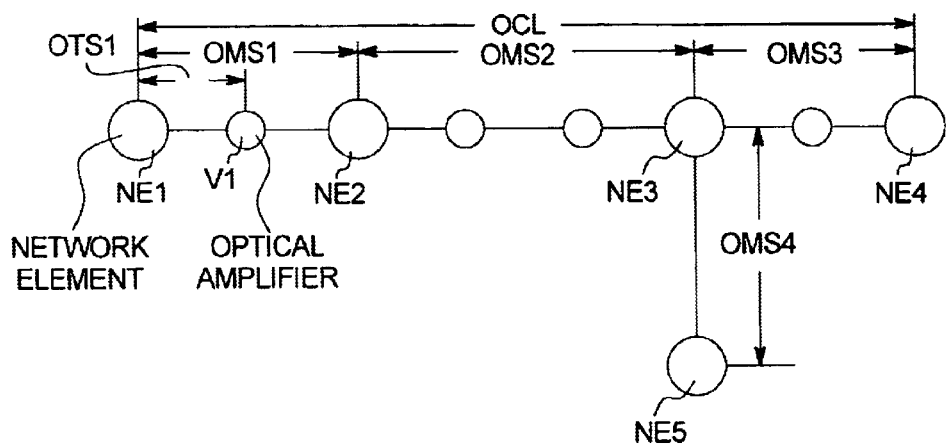
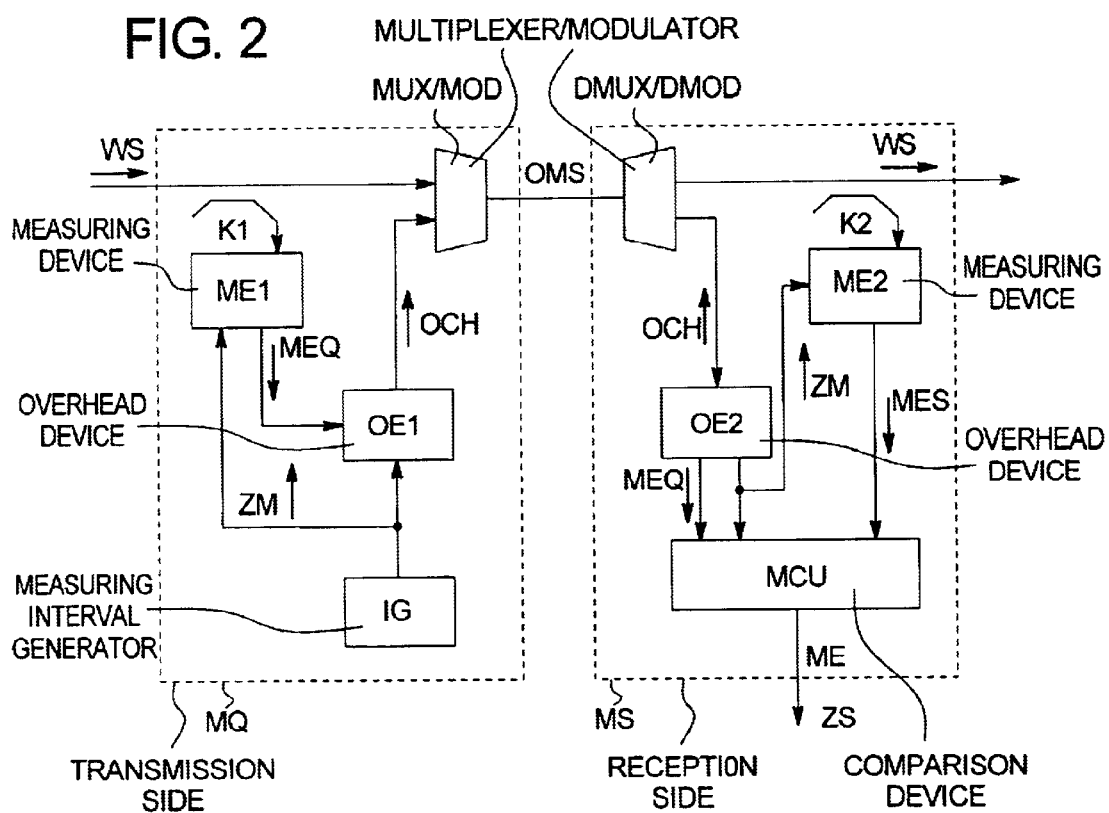

METHOD FOR MONITORING THE SIGNAL QUALITY IN OPTICAL NETWORKS

BACKGROUND OF THE INVENTION

The standardization of optical transport networks (OTN) is currently ensuing. A critical feature of the architecture of transport networks is the independence of the individual transmission layers, which control the transmission between different network elements, amplifiers or multiplexers for example. These layers can be planned, administered and monitored independently of each other.

SUMMARY OF THE INVENTION

It is an object of the present invention to provide a method for monitoring the signal quality given an optical transport network conceived in such a manner.

In general terms the present invention is a method for monitoring the signal quality of a transmission signal in optical data networks. The signal quality is measured within the same time intervals at the beginning and end of a transmission path. the time intervals are set by a measuring means at the transmission side. Corresponding time marks, as well as measuring results are transmitted to a measuring means at the reception side at the end of the transmission path via an additional channel. The measuring means at the reception side transmits these measured values and its own measured values to a central location or evaluates the measured values itself and transmits a measuring result.

Advantageous developments of the present invention are as follows.

Separate measurements are carried out for each WDM transmission channel given the transmission of a wavelength multiplex signal.

Each WDM transmission channel has a service channel allocated thereto.

The same timing mark is used by the measuring means at the transmission side for a plurality of transmission paths or path sections. The measuring results of a plurality of transmission paths or path sections are transmitted via the service channel. The measured values are transmitted to the central location by the measuring arrangement of the last path section.

The same timing mark is used by the measuring arrangement at the transmission side and the measuring arrangement at the reception side for measurements in a plurality of WDM transmission channels.

The measured values are transmitted as time multiplex signals in a service channel.

Respectively one service channel is allocated to a WDM transmission channel by overlay techniques.

Measured values that belong together, are evaluated in the measuring arrangement at the reception side and the modification of the signal quality that is caused by the transmission path is transmitted to the central location as a measuring result.

The present invention is also a method for monitoring the signal quality of a signal in optical data networks. The signal quality is measured within the same time intervals at the beginning and the end of a transmission path. The time intervals are controlled by a central location. The measured values are transmitted by measuring means to the central location, which evaluates the measured values.

The advantage of the invention is the exact coincidence of the measuring intervals appertaining to the same data sequences at the beginning and the end of a transmission path. Monitoring results of one or also a plurality of transmission paths can be transmitted via an allocated service channel.

A central location evaluates the measuring results and can initiate appropriate steps given decreasing signal quality.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a section of an optical transport network;

FIG. 2 is a schematic diagram of measuring means at the beginning and end of a transmission path;

DESCRIPTION OF THE PREFERRED EMBODIMENTS

FIG. 1 shows a section of an optical transport network. The transmission paths OMES1 through OMES4 (Optical Multiplex Section Layer) are to be monitored respectively between two network elements ME1 through ME5. The transmission paths include optical amplifiers, V1 for example. It is basically possible to monitor shorter path sections OTS between the network element NE1 and the amplifier V1 for example, or also longer path sections OCL with a plurality of network elements between the network elements NE1 and NE4 for example.

FIG. 2 shows a measuring arrangement at the transmission side MQ and a measuring arrangement at the reception side MS. Given the measuring arrangement at the transmission side, the signal that is to be checked, the useful load signal (working signal) WS, of a wavelength multiplexer (WDM signal) with a plurality of transmission channels for example, is supplied to a first measuring means ME1 via a first coupler K1, whereby only a small part in terms of power must be coupled out. This measuring means has the function of providing measurements of the signal state, or respectively, of the signal quality at the beginning of a transmission path. Signal parameters are the optical signal/-to-noise spacing, the power level or the frequency for example.

Figure 3:
FIG. 3 depicts data of a service channel.

The duration of a measuring interval is dependent on the signal parameter that is to be measured. For this purpose, a measuring interval generator IG periodically supplies, corresponding to FIG. 3, timing marks ZM in order to evaluate the exact same measuring interval at the transmission side and at the reception side—referring to the transmitted data.

Given an overhead means OE1, the service channel (monitoring channel) is generated by combining timing marks ZM and measured values MEQ. The respective measured value (measuring result) MEQ of the previous measuring interval, for example, is attached immediately after a timing mark. The useful signal and the service channel are combined in a multiplexer/modulator MUX/MOD before the transmission and are then transmitted via the same path.

The measuring arrangement MS at the reception side separates the service channel OCH from the received signal by a demultiplexer/demodulator DMUX/DMOD.

The timing marks ZM are decoded in a second overhead means OE2 and the measuring intervals of the reception side are generated. The measured values of the transmission side are supplied to a comparison means MCU.

The useful load signal WS is partly coupled out via a second coupler K2 and supplied to a second measuring means ME2. Within the same time intervals—exactly the same sections of the useful signal—quality measuring of the received signal is carried out and the measured values MES are also supplied to the comparison means MCU. With the aid of the measured values of the transmission side and reception side, this determining to what extent the signal quality has changed and sends the measuring results ME to a central location ZS.

The out-coupling of the useful load signal, which is carried out for measuring purposes, can also ensue at the measuring means at the transmission side following the multiplexer/modulator MUX/MOD (i.e. at the beginning of the actual transmission path) in order to preclude its influence. The same is correspondingly valid for the out-coupling at the reception side, which can ensue before the demultiplexer/demodulator. Modifications of the measured value by the monitoring channel can usually remain unconsidered, but can be corrected if necessary.

Figure 4:
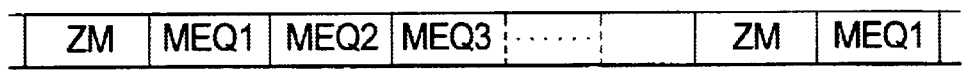
FIG. 4 depicts data of a service channel.

The transmission on the service channel is adapted to the requirements. Thus, also corresponding to FIG. 4, respectively one timing mark, followed by a plurality of measured values MEQ1, MEQ2, MEQ3, . . . , can be transmitted for different transmission channels and also different path sections. The expanding spectrum modulation, for example, which is described in the German patent application, serial number 19 713 952.3, is used for the modulation onto a WDM signal.

Figure 5:
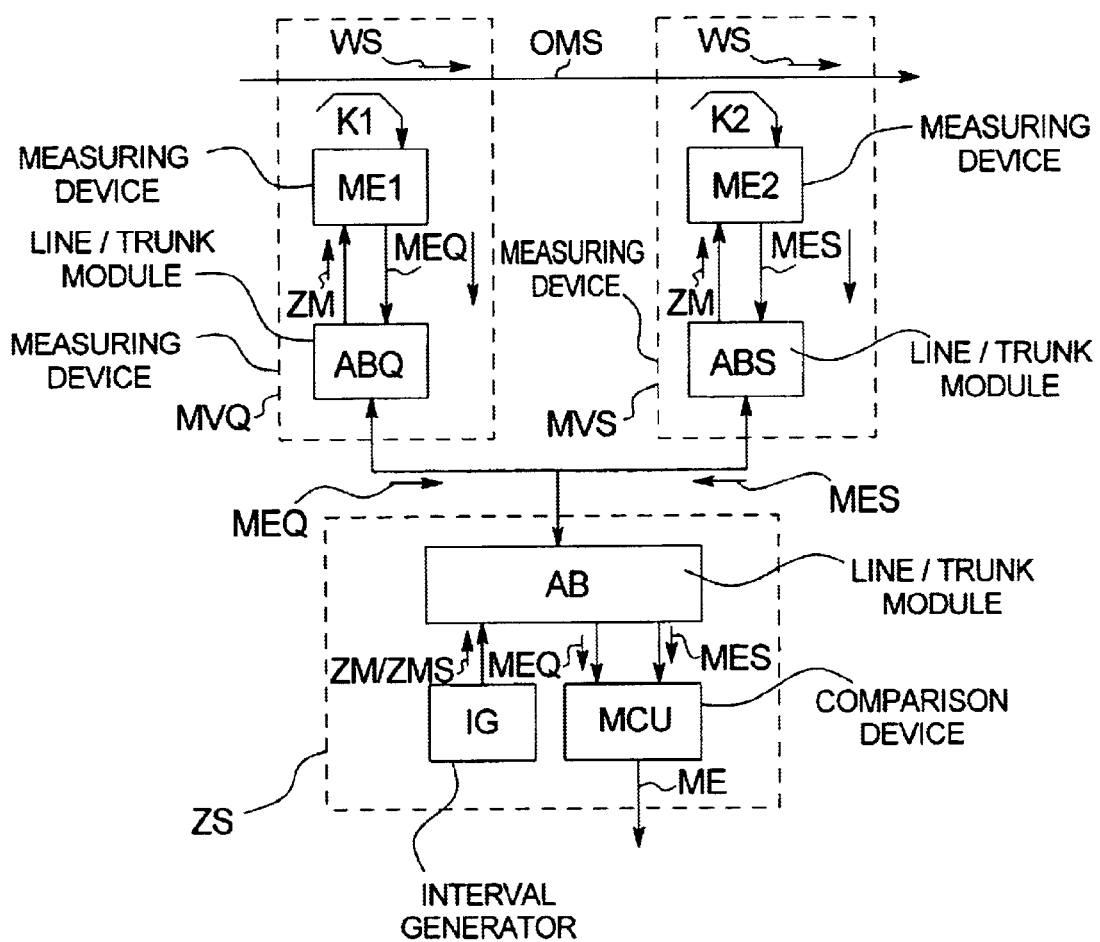
FIG. 5 is a schematic diagram of measuring means that are controlled by a central location.

FIG. 5 shows versions of the measuring means MVQ and MVS for the realization of a method wherein the transmission of time intervals and measured values via a service channel is forgone. The control of the measuring intervals ensues from the central location ZS wherein the interval generator IG is provided. From this location, via its line/trunk module AB, a timing mark is transmitted to the line/trunk module ABQ of the measuring means at the transmission side and to the line/trunk module ABS of the measuring means at the reception side. Since access problems can occur, it is also possible to transmit a synchronizing signal ZMES that respectively synchronizes interval generators that are present in the measuring means. The measured values MEQ and MES are transmitted in turn by the measuring means via the terminal assemblies to the central location ZS, which determines, in the comparison means MCU, the measuring result ME from the relation of the measured values.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for monitoring signal quality of a transmission signal in an optical data network independently from transmission layers, comprising the steps of:

setting predetermined time intervals by a first measuring device at a beginning of a transmission path at a transmission side;

measuring first signal quality values of data sequences of the transmission signal within said predetermined time intervals at the transmission side;

determining durations of said predetermined time intervals based on a desired signal parameters of the data sequences, and generating time marks defining said predetermined time intervals;

transmitting both time marks and first signal quality values via a service channel together with the transmission signal from the first measuring device over the transmission path to a second measuring device at a reception side;

measuring second signal quality values of said data sequences within said predetermined time intervals, defined by received time marks, by the second measuring device such that coincidence of the predetermined time intervals appertaining to same data sequences is assured; and transmitting via the second measuring device at the reception side both the first signal quality values and the second signal quality values from the second measuring device to a central location, or evaluating the first signal quality values and the second signal quality values and transmitting the result to the central location.

2. The method according to claim 1, wherein separate measurements are carried out for each WDM transmission channel given transmission of a wavelength multiplex signal.

3. The method according to claim 2, wherein each WDM transmission channel has a service channel allocated thereto.

4. The method according to claim 2, wherein a common timing mark is used by the first measuring device at the transmission side and the second measuring device at the reception side for measurements in a plurality of WDM transmission channels.

5. The method according to claim 2, wherein respectively one service channel is allocated to a WDM transmission channel by overlay techniques.

6. The method according to claim 1, wherein a common timing mark is used by the first measuring device at the transmission side for a plurality of transmission paths or path sections and wherein the first signal quality values of the plurality of transmission paths or path sections are transmitted via the service channel and wherein the first and second signal quality values are transmitted to the central location by a measuring device of a last path section.

7. The method according to claim 1, wherein the measured first signal quality values are transmitted as time multiplexed signal in the service channel.

8. The method according to claim 1, wherein the first and second signal quality values are evaluated in the second measuring device at the reception side and modification of the first signal quality values that is caused by the transmission path is transmitted to the central location as the measuring result.

* * * * *